United States Patent [19]
Van Uchelen et al.

[11] 3,876,372
[45] Apr. 8, 1975

[54] METHOD OF PREVENTING THE ATTACK OF PARTS OF SYNTHETIC AND NATURAL ORGANIC MATERIALS PRESENT IN THE SOIL

[76] Inventors: Hendrikus Van Uchelen, Emmasingel, Eindhoven; Oene Van Uchelen, Aaltje Noordewierstraat 9, The Hague, both of Netherlands

[22] Filed: Aug. 30, 1973

[21] Appl. No.: 392,871

[30] Foreign Application Priority Data
Sept. 4, 1972 Netherlands........................ 7212016
Mar. 22, 1973 Netherlands........................ 7304002

[52] U.S. Cl. ............................ 21/7; 21/58; 21/108; 21/121; 21/DIG. 3; 43/124; 52/517; 61/54; 111/6; 424/355
[51] Int. Cl. ....................... A61l 13/00; E02d 5/60
[58] Field of Search ......... 21/DIG. 1, DIG. 3, 7, 58, 21/121; 61/54; 52/517; 111/6; 195/28 R; 424/355

[56] References Cited
UNITED STATES PATENTS

| | | | |
|---|---|---|---|
| 1,039,824 | 10/1912 | Schumacher | 21/7 |
| 1,492,732 | 5/1924 | Knopf | 21/121 |
| 1,920,026 | 7/1933 | Tischler | 21/121 |
| 2,377,446 | 6/1945 | Payne | 21/DIG. 3 |
| 2,842,892 | 7/1958 | Aldridge et al. | 52/517 |
| 3,450,073 | 6/1969 | Baker | 111/6 |
| 3,589,054 | 6/1971 | Pascucci | 43/124 |
| 3,640,234 | 2/1972 | Carroll et al. | 111/6 |

Primary Examiner—Morris O. Wolk
Assistant Examiner—Dale Lovercheck
Attorney, Agent, or Firm—Frank R. Trifari; Norman N. Spain

[57] ABSTRACT

Parts present in the soil above the groundwater table are protected from attack by micro-organisms, termites and other oxygen-consuming organisms by injecting a hydrocarbon compound around the threatened parts into the soil, which compound is oxidized by micro-organisms present in the soil.

4 Claims, 1 Drawing Figure

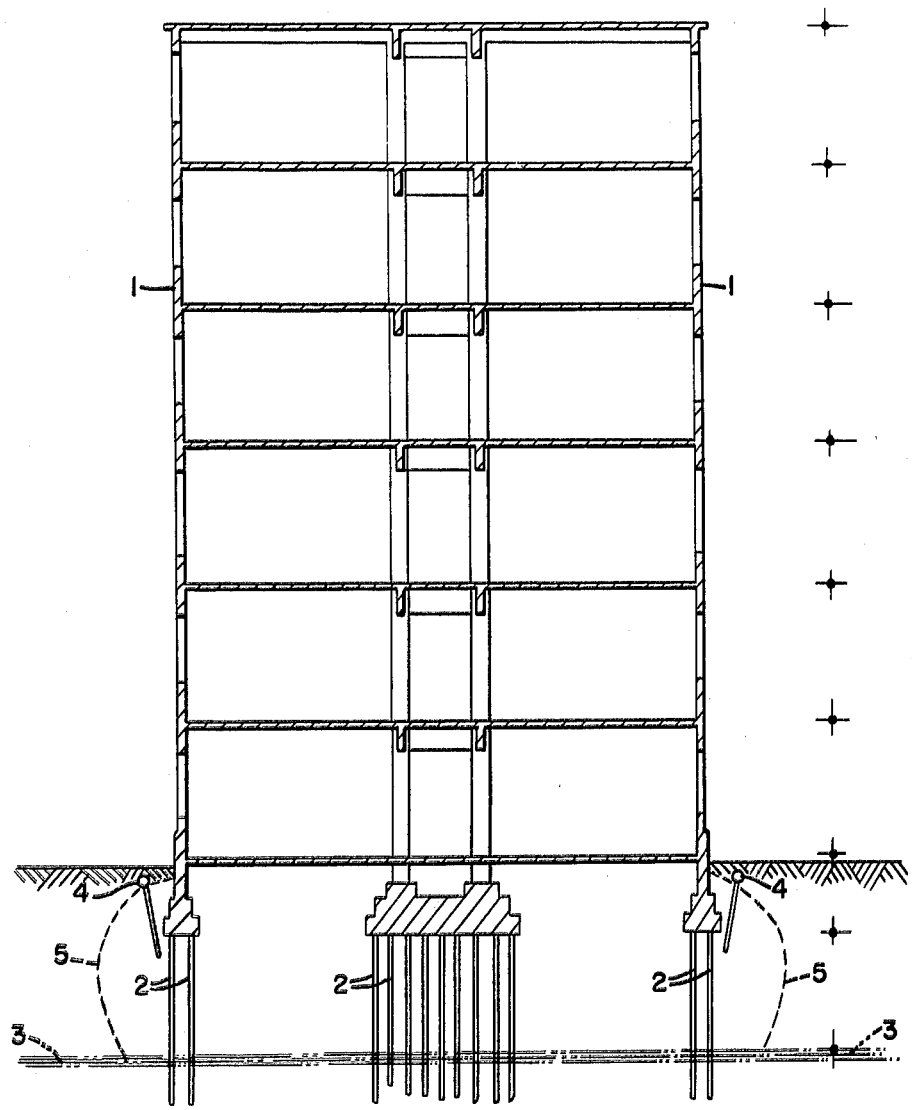

METHOD OF PREVENTING THE ATTACK OF PARTS OF SYNTHETIC AND NATURAL ORGANIC MATERIALS PRESENT IN THE SOIL

The invention relates to a method of and a device for preventing and/or stopping attack by oxygen-consuming organisms of parts of synthetic and natural organic materials present in the soil, for example, decay of timber piles which are completely or partly above the groundwater table, and attack by insects, such as termites, and by rats and mice.

Parts consisting of natural organic materials such as timber piles have proved to be defiant of centuries, provided that they remain below the groundwater table. It is however, generally known that rot occurs when due to a lowered groundwater table the timber piles project therefrom completely or partly and oxygen can penetrate. Such decaying piles will lose their bearing capacity after several years if no precautions are taken. This leads to sagging and in serious cases to the collapse of buildings supported by such piles. Materials which inhibit decay of timbered parts such as piles are known. The piles must, however, be treated with these materials before they are driven into the soil. The conventional preservatives cannot be used anymore after the piles have been driven into the soil and have taken up water. It is possible to replace the parts of timber piles projecting from the ground level by concrete caps and the like for existing buildings. This step is, however, costly. A total replacement of timber piles by concrete piles for existing buildings is generally still more expensive than the former step.

Another possibility is to raise the ground-water table locally by infiltration or injection of ground-water pumped off elsewhere or from lower strata. It has been found that decay phenomena in timber piles are stopped if the attacked parts are brought again below the locally raised groundwater table.

In addition or subsequent to decay phenomena caused by micro organisms, parts of synthetic or natural organic materials may be attacked by insects and other higher organisms which use the relevant materials as food or for other purposes, for example, as nesting material or which try to remove these materials if these parts are obstacles in the construction of nests or burrows.

An object of the invention is to provide a method of and a device for preventing and/or stopping attack by oxygen-consuming organisms of parts of synthetic and natural organic materials present in the soil, which method is as adequate as the local elevation of the ground-water table but which can be realized in a technically simpler manner and requires lower investments.

According to the invention this object is achieved by a method which is characterized in that an anerobic zone is created around the attack-threatened parts by injecting an organic compound into the soil which is oxidized by microorganisms present in the soil.

A gaseous organic compound is preferably used because such compounds can be injected into the soil in a simple manner. Suitable gaseous compounds are, for example, methane, ethane, propane and butane or mixtures of these gaseous hydrocarbon compounds.

The method according to the invention is partly based on the observation that a spheric zone is present around a leak in a natural gas pipe located in the soil from which the oxygen has disappeared because it has been used up by methane-oxidizing micro-organisms.

As may be assumed to be known, natural gas mainly consists of methane and furthermore it includes nitrogen and small percentages of ethane and other gaseous hydrocarbon compounds.

It was found that when injecting, for example, natural gas, propane and butane into the soil the circumstances in the soil are modified due to the activity of micro-organisms such that timber-attacking organisms become inactive because of lack of oxygen. In this manner an adequate protection against any kind of attack by oxygen-consuming organisms can be obtained.

This effect also occurs if for reasons of safety the gas or gas mixture to be injected is mixed with gas not maintaining combustion such as nitrogen, rare gas, and carbon dioxide ($CO_2$). Such an inert gas mixture may alternatively be obtained by partial combustion of natural gas or other hydrocarbons in air.

In this way it can be prevented that mixtures which are explosive in air are formed in closed or poorly ventilated spaces in or under buildings in whose vicinity the method according to the invention is used.

The gases to be used may optionally be withdrawn from existing distribution networks and introduced into the soil using its effective pressure or optionally after the pressure has been measured or increased. It is alternatively possible to use the pressure prevailing above a liquefied gas for this purpose.

When the attack-threatened parts are present below a gas-impervious layer, for example, a closed asphalt pavement or a concrete floor of a building it is sufficient to inject an organic compound into the soil around this layer. Thus it is not necessary that an organic compound is introduced into the soil below these layers. It is sufficient when an organic compound is injected into the soil around the gas-impervious layer at regular mutual distances in such a manner that in an area around this layer adjoining the ground-water table and this layer, for example, the concrete floor of a building an increased activity of methane-oxidizing micro-organisms is caused which prevents the penetration of oxygen under the layer, in this case the floor of the building. When using this method it is of course necessary to seal possible cracks or holes in such layers in such a way that a gastight layer is obtained. In this manner the attack of, for example, timber piles and cable sheaths by fungi, termites and mice may be prevented effectively.

A device with which the method according to the invention may be performed consists of a number of pipes having outlet apertures in the soil which are connected to a distribution mains for the organic compound such as a gaseous compound to be injected into the soil. Such a device may be provided with gas pressure reducers and/or pumps, burners, mixing installations, analysis apparatus and may be connected to a gas distribution mains or a supply tank filled with gas possibly in a liquefied state.

If desired, the absence of oxygen under the building may be regularly checked at a number of strategic points, for example, with the aid of automatic registering equipment.

An essential advantage of the method according to the invention is that when the supply of the organic material to the soil is temporarily interrupted due to breakdown or repair the anerobic zone decrease only slowly. This is due to the fact that the comparatively large quantity of oxygen which is necessary to oxidize the organic material and the reduced anorganic compounds accumulated during injection of the organic compound into the soil becomes available only relatively slowly by diffusion. When the supply of the organic compound is permanently interrupted the anerobic zone is found to have disappeared completely only after several months. The original anerobic zone is then found to be enriched with nitrogen and humus.

An embodiment of the method according to the invention will be described in detail with reference to the accompanying drawing.

In the drawing the sole FIGURE diagrammatically shows a building supported by timber piles and using gas injection pipes.

The building 1 is supported by a number of timber piles 2 which are partly above and partly below the groundwater table 3. A plurality of gas injection pipes 4 is provided around the building. A zone in the soil (denoted by a broken line 5 is formed around the outlet aperture preventing the penetration of oxygen mainly by microbiologic oxidation of the injected gas and furthermore by expelling it from the soil around the pipe. When 75 litres of a mixture of 1 part by volume of natural gas and 5 parts by volume of nitrogen were injected per hour, this zone was found to have a radius of approximately 2 metres measured from the outlet aperture of the gas. Attack of the timber piles 2 in the soil above the groundwater table 3 by oxygen-consuming organisms is then prevented or stopped.

We claim:

1. A method of combatting attack of structures by oxygen-consuming organisms, the structures being subject to attack by said organisms and the structures being present in soil at least partially above the groundwater table of the soil, comprising injecting into the soil surrounding said structure in the area above the groundwater table a gaseous hydrocarbon oxidizable by micro-organisms present in the soil thereby forming an anerobic zone around the threatened parts of said structure.

2. The method of claim 1 wherein the gaseous hydrocarbon is selected from the group consisting of methane, ethane, propane, butane and mixtures thereof.

3. The method of claim 1 wherein in addition to the gaseous hydrocarbon a non-oxidizable gas is injected into the soil.

4. The method of claim 1 wherein the gaseous hydrocarbon is injected under a gas-impervious stratum.

* * * * *